(12) United States Patent
Coenen et al.

(10) Patent No.: US 10,392,507 B2
(45) Date of Patent: Aug. 27, 2019

(54) SILICONE ELASTOMER, COMPOSITION, AND OPTICAL COUPLING ELEMENT

(71) Applicant: PMA/TOOLS AG, Willich (DE)

(72) Inventors: Dominik Coenen, Viersen (DE); Michael Muenter, Dormagen (DE)

(73) Assignee: PMA/TOOLS AG, Willich (DE)

( * ) Notice: Subject to any disclaimer, the term of this patent is extended or adjusted under 35 U.S.C. 154(b) by 23 days.

(21) Appl. No.: 15/544,261

(22) PCT Filed: May 9, 2016

(86) PCT No.: PCT/EP2016/060280
§ 371 (c)(1),
(2) Date: Jul. 18, 2017

(87) PCT Pub. No.: WO2016/206848
PCT Pub. Date: Dec. 29, 2016

(65) Prior Publication Data
US 2017/0369706 A1 Dec. 28, 2017

(30) Foreign Application Priority Data

Jun. 23, 2015 (EP) .................................. 15173315

(51) Int. Cl.
*C08L 83/04* (2006.01)
*B60J 1/00* (2006.01)
*C08G 77/04* (2006.01)

(52) U.S. Cl.
CPC ............ *C08L 83/04* (2013.01); *C08G 77/045* (2013.01); *B60J 1/006* (2013.01); *C08L 2205/02* (2013.01)

(58) Field of Classification Search
CPC ...... C08L 83/04; C08L 83/04; C08L 2205/02; B60J 1/006; G08G 77/045
See application file for complete search history.

(56) References Cited

U.S. PATENT DOCUMENTS

| 4,824,891 A * | 4/1989 | Laurent ................. B21D 22/10 |
| | | 524/264 |
| 5,519,080 A * | 5/1996 | Matsushita ............. C08L 83/04 |
| | | 524/268 |
| 6,581,484 B1 | 6/2003 | Schuler |

FOREIGN PATENT DOCUMENTS

| DE | 102004048434 A1 | 4/2006 | |
| DE | 102007039776 A1 * | 2/2009 | ............ B60S 1/0822 |
| DE | 102007039776 A1 | 2/2009 | |
| EP | 0470745 A2 | 2/1992 | |
| EP | 1027204 A2 | 8/2000 | |
| EP | 1160288 A1 | 12/2001 | |
| EP | 2181023 B1 | 5/2010 | |

OTHER PUBLICATIONS

DE-102007039776-A1, Feb. 2009, Machine translation.*

* cited by examiner

*Primary Examiner* — Satya B Sastri
(74) *Attorney, Agent, or Firm* — Leydig, Voit & Mayer, Ltd.

(57) ABSTRACT

A silicone elastomer includes a plasticizer component formed by or containing oil or an oil blend. The oil or at least one oil of the oil blend has a viscosity that is equal to or less than 350 mm$^2$/s. The oil or the at least one oil of the oil blend is, for example, a silicone oil.

8 Claims, No Drawings

SILICONE ELASTOMER, COMPOSITION, AND OPTICAL COUPLING ELEMENT

CROSS-REFERENCE TO PRIOR APPLICATION

This application is a U.S. National Stage Application under 35 U.S.C. § 371 of International Application No. PCT/EP2016/060280 filed on May 9, 2016, and claims benefit to European Patent Application No. EP 15173315.1 filed on Jun. 23, 2015. The International Application was published in German on Dec. 29, 2016 as WO 2016/206848 A1 under PCT Article 21(2).

FIELD

The invention relates to a silicone elastomer comprising a plasticizer component formed by oil or an oil blend or else comprising a plasticizer component containing oil or an oil blend. The invention also relates to a composition that can be cured to form a silicone elastomer and that contains a silicone rubber component, a cross-linking component, a cross-linking catalyst and a plasticizer component. The invention also relates to an optical coupling element to be arranged between a sensor and the inside of a vehicle window pane.

BACKGROUND

Optical coupling elements of the above-mentioned type are employed to optically couple an optical sensor located in the interior of a vehicle to the window pane of the vehicle. In order to ensure the reliable functioning of the sensor, it is desirable for the refractive index of the material used for the coupling element to be the same as the refractive index of the window pane of the vehicle. Furthermore, it is preferred for the material used for the coupling element to have the highest possible transmittance or permeability to light of the relevant wavelength. In this context, this can be light in the visible or invisible spectral range, depending on the application case.

In view of the above-mentioned requirements, the state of the art makes use of silicone materials as the materials for the coupling element. Less highly cross-linked silicone materials, so-called silicone gels, or else more highly cross-linked silicones, hereinafter referred to as silicone elastomers, can be employed.

An example of a silicone gel is disclosed in European patent specification EP 2 181 023 B1. SILGEL 612 is a trade name for such a silicone gel. Such materials are commercially available, for instance, from the BAYER company or from the WACKER company. These less highly cross-linked silicone gels are gelatinous, in other words, not inherently stable. For this reason, such coupling elements are produced "in situ", that is to say, as a free-flowing and then curing material that is placed into a space in the housing of the optical sensor. The sensor housing is subsequently attached to the window pane, whereby the silicone gel comes to rest against the window pane. Such a production technique is demanding, both at the time of the initial installation and when a vehicle window pane has to be repaired. When a vehicle window pane or a sensor is repaired, it is also the drawback that the coupling element, which is not inherently stable, is destroyed and therefore cannot be re-used. Silicone gels, however, entail the advantage that their good optical properties remain constant even after a prolonged service life, also in those cases when the vehicle is exposed to severe stresses, for example, direct sunlight over a prolonged period of time. Moreover, they are intrinsically very soft and therefore can easily be adapted to the contour of the window pane.

Somewhat less soft silicone gels are known, for instance, under the trade name SEMICOSIL 912, made by the WACKER company. These silicone gels are likewise produced "in situ", as described above and, for example, in European patent application EP 1 027 204 A2. They entail the drawbacks already elaborated upon above.

Diverging from an "in-situ processing", more highly cross-linked silicone elastomers can be prepared as molded parts that can be handled manually and that can thus be produced away from the place of installation and subsequently handled manually. Examples of such coupling elements are those manufactured by the PRECISION REPLACEMENT PARTS CORPORATION of San Diego, Calif., United States.

Since silicone elastomers that have not been plasticized are too hard for direct use, an oil can be added as a plasticizing component to the silicone formulation during the production of the coupling elements. This markedly improves the installation and application properties since the surfaces of the molded parts that rest against the optical sensor and against the inside of the vehicle window pane can adapt to the corresponding contact surfaces of the optical sensor and of the inside of the vehicle window pane. Such improved coupling elements are known by the registered trade designation SENSORTACKREADY and are made by the applicant.

SUMMARY

In an embodiment, the present invention provides a silicone elastomer including a plasticizer component formed by or containing oil or an oil blend. The oil or at least one oil of the oil blend has a viscosity that is equal to or less than 350 mm$^2$/s. In another embodiment, a composition that can be cured to form a silicone elastomer includes a silicone rubber component, a cross-linking component, a cross-linking catalyst and a plasticizer component, wherein the plasticizer component is or contains an oil or an oil blend, and wherein the oil or at least one oil of the oil blend has a viscosity that is equal to or less than 350 mm$^2$/s. In a further embodiment, an optical coupling element arranged or to be arranged between a sensor and the inside of a vehicle includes a molded part that can be handled manually and includes the plasticizer component and/or is produced using the composition.

DETAILED DESCRIPTION

It has been found that the inherently stable coupling elements described above can be processed particularly easily and can even be re-used, as a result of which the repair or replacement of a vehicle window pane or of a sensor is greatly facilitated. However, the inventors have also recognized that, under very unfavorable conditions, for example, upon prolonged and intense exposure to sunlight, especially in hot climates, it can happen that the coupling element bleeds oil. This oil can then be seen on the inside of the vehicle window pane. The bleeding of oil can also cause the volume of the coupling element to diminish, so that the optical properties or the coupling properties of the coupling element change, which can have a detrimental effect on the proper functioning of the optical sensor.

Before this backdrop, according to an embodiment of the present invention, it is possible to avoid the drawbacks of the more highly cross-linked silicone elastomers while combining their advantages in terms of easy handling with the advantages of the good optical properties of the less highly cross-linked silicone gels, whereby these properties remain unchanged, even after a prolonged period of use.

According to an embodiment, a silicone elastomer of the above-mentioned type is provided, wherein the oil or at least one oil of the oil blend has a viscosity that is equal to or less than 350 mm$^2$/s. By means of a composition of the above-mentioned type, it is possible to obtain the above-described advantages in that the plasticizer component is or contains an oil or an oil blend, whereby the oil or at least one oil of the oil blend has a viscosity that is equal to or less than 350 mm$^2$/s.

According to the invention, it has been recognized that it is advantageous to retain a plasticizer component as part of the silicone elastomer or of a composition, so that the optical coupling element can be adapted to the adjoining contact surfaces of the optical sensor and to the inside of the vehicle window pane, without the formation of air bubbles or inclusions. According to the invention, this plasticizer component is or comprises an oil having a low kinematic viscosity (relative to 25° C.). Surprisingly, the undesired bleeding of oil in silicone elastomers can be prevented by using such a low-viscosity oil.

For instance, the oil or at least one oil of the oil blend has a viscosity that is equal to or less than 200 mm$^2$/s, preferably equal to or less than 100 mm$^2$/s, especially equal to or less than 50 mm$^2$/s, particularly preferably equal to or less than 25 mm$^2$/s.

The viscosities indicated are valid for a temperature of 25° C. and are determined in accordance with DIN 53019-1:2008-09 employing a rotational viscometer (Malvern Instruments, plate/cone measuring system 2°/60, that is to say, a cone angle of 2° and a diameter of 60 mm). The values refer to the kinematic viscosity ν which is linked to the dynamic viscosity η by the relationship η=ν·ρ, wherein ρ stands for the density of the oil at the measuring temperature. At a density ρ=1000 kg/m$^3$, the numerical values for the kinematic viscosity ν in mm$^2$/s and the dynamic viscosity η in mPas are identical.

Excellent properties that remain constant over a prolonged period of use can be obtained in that the oil or at least one oil of the oil blend is or contains a silicone oil. Preferably, exclusively silicone oil is provided as the plasticizer component.

Surprisingly, the above-mentioned advantages are also especially obtained when a very high percentage by weight of the plasticizer component is present, for example, at least 20% of the total weight of the silicone elastomer or of the composition. Other preferred percentages by weight are at least 30% or at least 40% or at least 50% or at least 60%. It is particularly advantageous that a very low oil viscosity brings about reliable protection against undesired oil bleeding, even in case of the last mentioned, unusually high, percentages by weight of the oil. This allows the production of coupling elements that are easy to handle manually and that are made of silicone elastomers having a sufficiently low hardness, along with a markedly improved temperature resistance in terms of oil bleeding.

When it comes to an optical coupling element of the type described above, the above-mentioned objective is achieved in that the optical coupling element is configured as a molded part that is easy to handle manually and that contains the silicone elastomer described above, in particular, it is made of a silicone elastomer as described above, and/or in that the optical coupling element can be made of or is made of a composition as described above.

An example of a composition that can be cured to form a silicone elastomer and that contains a silicone rubber component, a cross-linking component and a cross-linking catalyst is the NEUKASIL RTV 27 system manufactured by ALTROPOL KUNSTSTOFF GMBH of Stockelsdorf, Germany. This system comprises an addition cross-linking RTV-2 silicone rubber, namely, NEUKASIL RTV 27 and a cross-linking agent, namely, NEUKASIL A 108, and it can be cross-linked to form a silicone elastomer that is mixed with a plasticizer component in the form of an oil. This oil can be one of the silicone oils available from the CARL ROTH company of Karlsruhe, Germany under the trade names SILIKONOEL M 350, SILIKONOEL M 200, etc., whereby the type designation also indicates the kinematic viscosity in mm$^2$/s.

Example 1

A total of 100 g of NEUKASIL RTV 27 (component A) and 10 g of NEUKASIL 108 (component B), which had been previously homogenized by stirring, are weighed. Component B is then quickly stirred into component A until a homogenous mixture is obtained with a mixing ratio A:B=10:1, whereby as little air as possible is introduced into the mixture. The mixture is de-gassed in a vacuum (5 minutes at 20 mbar). Subsequently, 165 g of the silicone oil SILIKONOEL M 200 (viscosity of 20 mm$^2$/s) is stirred into the mixture until a homogeneous composition is formed, which then has a silicone oil percentage of 60% by weight.

A bowl-shaped aluminum mold having a diameter of 43 mm and a height of 12 mm is filled with the composition. A filling level of 2 mm to 3 mm is selected for a coupling element in order to measure the temperature resistance. A filling level of 6 mm is selected for a coupling element for a hardness measurement according to Shore D or Shore 00.

After a cross-linking time of 24 hours at room temperature, the coupling element consisting of cross-linked silicone elastomer is removed from the mold. The Shore hardness is measured 24 hours after removal from the mold in accordance with DIN 53505 (Shore A) or on the basis of this standard (Shore 00) (specimen thickness of approximately 6 mm).

The coupling element thus obtained is clear, transparent and easy to handle manually, and it has a hardness of 30 Shore 00. This low hardness can no longer be measured according to Shore A.

For purposes of testing the temperature resistance, the coupling element (thickness of 2 mm to 3 mm) is laid flat onto a glass plate and kept for 6 hours at 105° C., whereby the glass plate is positioned at 45° relative to the horizontal. After the temperature-controlled holding time and removal of the coupling element from the glass plate, no oil film can be detected on the glass sheet or on the coupling element.

Examples 2 to 5

Additional embodiments 2 to 5 adhere to the procedure already explained above for Example 1 and they differ from the latter only in terms of the viscosity and quantity of the silicone oil added as the plasticizer. Details and results are compiled in Table 1, together with the data pertaining to Example 1.

TABLE 1

| | | \multicolumn{5}{c}{Example No.} | | | | |
|---|---|---|---|---|---|---|
| | | 1 | 2 | 3 | 4 | 5 |
| mixing ratio | A:B | 10:1 | 10:1 | 10:1 | 10:1 | 10:1 |
| silicone oil, viscosity | mm$^2$/s | 20 | 50 | 100 | 200 | 350 |
| silicone oil, percentage in the composition | %-wt. | 60 | 35 | 15 | 10 | 5 |
| hardness (24 hr) (specimen thickness: 6 mm) | Shore A | — | 19 | 28 | 31 | 33 |
| hardness (24 hr) (specimen thickness: 6 mm) | Shore 00 | 30 | 59 | 72 | 75 | 77 |
| oil film/oil bleeding (specimen thickness: 2 mm to 3 mm) | after 6 hr at 105° | no | no | no | no | no |

Other variants of the formulations given by way of an example are conceivable. For instance, a lower cross-linking density can be obtained by slightly under-dosing the cross-linking component B in that, for example, the mixing ratios of A:B are set at 10:0.95 or 10:0.9 or 10:0.85. It has been found that this step further enhances the temperature stability in terms of oil bleeding, or that it allows a further increase in the oil quantity while retaining the same temperature stability. In this manner, the hardness of the silicone elastomer can be further reduced so that softer coupling elements can be produced.

In other words, according to the invention, it is not oils having a high viscosity of more than 1000 mm$^2$/s at a percentage by weight of less than 20%, but rather low-viscosity oils, preferably at a high percentage by weight, that are used in a silicone elastomer or in a composition for an optical coupling element While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical coupling element, comprising:
a molded silicone elastomer comprising a plasticizer component formed by or containing oil or an oil blend, wherein the oil or at least one oil of the oil blend has a viscosity that is equal to or less than 350 mm$^2$/s, and/or being produced out of a composition comprising a silicone rubber component, a cross-linking component, a cross-linking catalyst and the plasticizer component, the silicone elastomer being capable of being manually handled, wherein the optical coupling element is arranged between a sensor and the inside of a vehicle window pane.

2. The optical coupling element according to claim 1, wherein the oil or the at least one oil of the oil blend is a silicone oil.

3. The optical coupling element according to claim 1, wherein the percentage by weight of the plasticizer component is at least 20% of the total weight of the silicone elastomer.

4. The optical coupling element according to claim 1, wherein the silicone elastomer is produced out of the composition comprising the silicone rubber component, the cross-linking component, the cross-linking catalyst and the plasticizer component.

5. The optical coupling element according to claim 4, wherein the plasticizer component is or contains a silicone oil.

6. The optical coupling element according to claim 4, wherein the percentage by weight of the plasticizer component is at least 20% of the total weight of the composition.

7. The optical coupling element according to claim 1, wherein the silicone elastomer does not flow at room temperature.

8. The optical coupling element according to claim 1, wherein the silicone elastomer exhibits no bleeding at a temperature of 105° C.

* * * * *